UNITED STATES PATENT OFFICE.

JOSEPH KOETSCHET AND MAURICE BEUDET, OF LYON, FRANCE, ASSIGNORS TO SOCIETE CHIMIQUE DES USINES DU RHONE, ANCIENNEMENT GILLIARD, P. MONNET ET CARTIER, OF PARIS, FRANCE.

PROCESS FOR THE PRODUCTION OF ACETIC ANHYDRID AND POLYMERIZED OR NON-POLYMERIZED ACETIC ALDEHYDE OR ACETIC ACID.

1,306,963.     Specification of Letters Patent.     Patented June 17, 1919.

No Drawing.     Application filed August 28, 1917. Serial No. 188,556.

*To all whom it may concern:*

Be it known that we, JOSEPH KOETSCHET, a citizen of the Swiss Republic, of 67 Boulevard des Belges, Lyon, France, and MAURICE BEUDET, a citizen of the Republic of France, of 25 Rue Bugeaud, Lyon, France, have invented a certain new and useful Process for the Production of Acetic Anhydrid and Polymerized or Non-Polymerized Acetic Aldehyde or Acetic Acid, of which the following is a specification.

It is known from the specification of German Patent No. 284,996 (*Centralblatt* 1915—2—p. 294) that ethylidene diacetate can be decomposed into aldehyde and acetic anhydrid.

This result is obtained by heating the ethylidene diacetate at high temperatures, with or without catalyzers. The said specification further states that increase of pressure assists the reaction.

In all these methods of working, the necessity to employ high temperatures is a marked disadvantage. A large quantity of tarry products is produced in the course of the decomposition, which reduce the yield enormously and block up the apparatus. Moreover many catalyzers (acids and acid salts) cannot undergo this high heat without decomposition.

The applicants have found that these drawbacks are obviated when the ethylidene diacetate is heated *in vacuo* well below its boiling point at atmospheric pressure, in presence of acids, acid salts, or other catalyzers. The reaction has been found to take place with an approximately quantitative yield, without tarring or deterioration of the catalyzer.

The remarkable fact is also observed that the aldehyde formed distils in the form of paraldehyde, which offers very important technical advantages from the point of view of the condensation *in vacuo* of the reaction product.

By maintaining the obtained mixture of paraldehyde and acetic anhydrid for a considerable time at a moderate temperature, or by heating it with judiciously chosen known depolymerizing agents, the acetic aldehyde can be distilled off.

If a current of pure or dilute oxygen is introduced in suitable quantity into the mixture during this latter treatment, a mixture of acetic acid and acetic anhydrid can be finally obtained.

Example: In a distilling apparatus a mixture of

Ethylidene diacetate ____ 400 parts
Sulfuric acid (66° Bé.) __ 8 parts is heated at about 70°–80° C. at a pressure of about 100 mm. In two hours 350 parts of a mixture of paraldehyde and acetic anhydrid are collected by distillation.

As the ethylidene diacetate boils at about 115° C. under 100 mm. pressure, the reaction consequently takes place even below the boiling point corresponding to this pressure.

There remain in the apparatus 50 parts of unaltered diacetate and the sulfuric acid introduced at the commencement. On to this residue are charged another 350 parts of diacetate, and the operation can begin again.

The mixture of anhydrid and paraldehyde is treated as before stated.

What we claim and desire to secure by Letters Patent is:

A process of treating ethylidene diacetate, which consists in heating the same under reduced pressure and in the presence of a catalyzer which facilitates formation of acetic anhydrid and polymerized acetaldehyde, to such a temperature that a mixture of acetic anhydrid and polymerized acetaldehyde is produced.

In testimony whereof we have signed our names to this specification.

JOSEPH KOETSCHET.
MAURICE BEUDET.

In the presence of—
   LUCIENNE BOUVERET,
   JAMES G. FINLEY.